US008772421B2

(12) United States Patent
Bachon et al.

(10) Patent No.: US 8,772,421 B2
(45) Date of Patent: *Jul. 8, 2014

(54) POLYMERS WITH IMPROVED STRENGTH COMPRISING MIXED OXYALKYL UNITS

(75) Inventors: Thomas Bachon, Duesseldorf (DE); Andreas Ferencz, Duesseldorf (DE); Martin Majolo, Erkelenz (DE); Jennifer Lambertz, Langenfeld (DE); Friedhelm Koepnick, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 1332 days.

This patent is subject to a terminal disclaimer.

(21) Appl. No.: 11/415,053

(22) Filed: May 1, 2006

(65) Prior Publication Data

US 2006/0194930 A1 Aug. 31, 2006

Related U.S. Application Data

(63) Continuation of application No. PCT/EP2004/011520, filed on Oct. 14, 2004.

(30) Foreign Application Priority Data

Oct. 29, 2003 (DE) .................................. 103 50 481

(51) Int. Cl.
  C08G 77/04 (2006.01)
  C08G 77/14 (2006.01)
  C08L 83/04 (2006.01)
  C08L 83/06 (2006.01)
  C08L 83/12 (2006.01)

(52) U.S. Cl.
  USPC ................ 525/474; 525/477; 528/10; 528/33

(58) Field of Classification Search
  USPC ........... 528/76, 77, 10, 33; 556/414; 525/474, 525/477
  IPC ........... C08G 77/14, 77/18, 77/20, 77/50, 77/52, C08G 77/60, 77/80, 81/00; C08L 83/04, C08L 83/06
  See application file for complete search history.

(56) References Cited

U.S. PATENT DOCUMENTS

| | | | | |
|---|---|---|---|---|
| 3,425,999 A | * | 2/1969 | Axelrood et al. | 528/76 |
| 3,856,756 A | * | 12/1974 | Wagner et al. | 528/49 |
| 4,183,821 A | * | 1/1980 | Langdon et al. | 516/191 |
| 5,429,759 A | | 7/1995 | Andrieu et al. | |
| 5,461,122 A | * | 10/1995 | Yilgor et al. | 525/474 |
| 5,888,322 A | | 3/1999 | Holland | |
| 6,207,766 B1 | * | 3/2001 | Doi et al. | 525/403 |
| 6,306,966 B1 | | 10/2001 | Horie et al. | |
| 6,310,170 B1 | * | 10/2001 | Johnston et al. | 528/38 |
| 6,753,402 B1 | | 6/2004 | Bauer et al. | |
| 2002/0013427 A1 | * | 1/2002 | Tsuji et al. | 525/523 |
| 2004/0241551 A1 | | 12/2004 | Nakamura et al. | |
| 2005/0234177 A1 | | 10/2005 | Zaghib et al. | |

FOREIGN PATENT DOCUMENTS

| | | | |
|---|---|---|---|
| CA | 2364598 | * | 10/2000 |
| EP | 0 265 929 B1 | | 7/1992 |
| EP | 623653 | | 11/1994 |
| EP | 677543 | | 10/1995 |
| EP | 0 623 653 A1 | | 12/2000 |
| EP | 0 677 543 B1 | | 1/2003 |
| EP | 1 457 510 A1 | | 9/2004 |
| GB | 1 526 022 | | 9/1978 |
| JP | 04-015251 | | 1/1992 |
| JP | 4-15251 A | * | 1/1992 |
| JP | 06-340739 | | 12/1994 |
| JP | 2001-055503 | | 2/2001 |
| JP | 2003-187637 | | 4/2003 |
| JP | 2003-187637 | | 7/2003 |
| WO | 00/59516 | | 10/2000 |
| WO | WO 00/59516 A1 | | 10/2000 |
| WO | 01/27185 | | 4/2001 |
| WO | WO 01/27185 A2 | | 4/2001 |
| WO | 03/063287 | | 7/2003 |
| WO | WO 03/063287 A2 | | 7/2003 |
| WO | WO 2004/048472 A2 | | 6/2004 |

OTHER PUBLICATIONS

Patent Abstracts of Japan, vol. 2003, No. 11, Nov. 5. 2003 for JP 2003 187637.
Ullmanns Encyclopedia der Technischen Chemie, 4th Edition, vol. 19, pp. 62-65.

* cited by examiner

Primary Examiner — Rabon Sergent
(74) Attorney, Agent, or Firm — James E. Piotrowski

(57) ABSTRACT

The invention relates to compositions that are produced using a mixture from two or more polyols and to a method for producing said compositions. The invention also relates to the use of said compositions as adhesives, sealing compounds, surface-coating agents, fillers or for producing molded parts.

3 Claims, No Drawings

POLYMERS WITH IMPROVED STRENGTH COMPRISING MIXED OXYALKYL UNITS

This application is a continuation under 35 U.S.C. §365(c) and 35 U.S.C. §120 of international application PCT/EP2004/011520, filed on Oct. 14, 2004. This application also claims priority under 35 U.S.C. §119 of DE 103 50 481.8, filed Oct. 29, 2003, which is incorporated herein by reference in its entirety.

BACKGROUND OF THE INVENTION

The invention relates to polymeric compositions, particularly polyurethanes, which are producible using a mixture of two or more polyols, a process for manufacturing such compositions as well as the use of such compositions.

Polyurethanes, particularly due to their use in surface coating agents, adhesives and in sealing technology, have become versatile plastics that can be used in many technological areas. Those polyurethanes comprising reactive end groups that can be crosslinked by means of an externally added compound are of particular interest. Examples of such end groups are those that can react with water, for example in the form of humid air.

This type of reactivity allows the reactive polyurethanes to be brought in a processable state to the required place and cured by the action of humid air or the like with the reactive end group compounds. Generally, the curing agent is added prior to processing, with the result that after the addition of the curing agent, there remains only a limited processing time available to the processor.

Exemplary reactive end groups include isocyanate end groups. Polyurethanes with such end groups already cure with suitable functionality under the influence of air humidity. However, in the presence of water, for example, the use of polyurethanes comprising NCO end groups can give rise to the formation of carbon dioxide. Whereas this generally does not cause a problem, for some applications, however, the generation of carbon dioxide has adverse effects on the surface structure. Moreover, such polyurethanes will often not adhere to smooth, inert surfaces, for example on glass, ceramic, metal surfaces and the like.

To redress this, i.e. in order to permit a strong and permanent bond of polyurethanes with the abovementioned surfaces, in such cases it has been proposed in the prior art to introduce, for example, an alkoxy silane as the reactive end group into the polyurethane.

Over the last years, polymers carrying silyl groups in particular have become increasingly important as binders for adhesives, sealants and foams. These polymers are generally polyurethane prepolymers comprising alkoxysilane end groups. However, other solutions to the above problems have been suggested in the prior art.

Thus, a curable polymer based on an acrylic and/or methacrylic acid ester and a curable oxyalkylene polymer has been described, for example in EP 0 265 929 B1. In particular, a curable compound is described comprising (a) a copolymer that comprises silicon-containing functional groups capable of being crosslinked through the formation of siloxane bonds and whose molecular chain consists of 50 wt. % or more of
  (1) an alkyl acrylate ester monomer unit and/or an alkyl methacrylate ester monomer unit that each have an alkyl group of 1 to 8 carbon atoms, and
  (2) an alkyl acrylate ester monomer unit and/or an alkyl methacrylate ester monomer unit that each have an alkyl group of at least 10 carbon atoms.

(b) an oxyalkylene polymer comprising silicon-containing functional groups capable of being crosslinked through the formation of siloxane bonds; and (c) a curing accelerator.

Generally, solvent-based elastic adhesives are easy to handle. However, such elastic adhesives possess essential ingredients that are environmentally toxic and moreover are inflammable. Numerous attempts have been made to overcome these disadvantages. For example, alternatives such as solvent-free adhesives and aqueous contact adhesives have been developed.

A moisture curable composition that is suitable as an adhesive is described in U.S. Pat. No. 6,306,966 B1. The composition is produced by mixing a component A comprising.

(i) monomer units of alkyl acrylate- and/or alkyl methacrylate carrying silyl groups with an alkyl group containing 1 to 8 carbon atoms and (ii) monomer units of alkyl acrylate- and/or alkyl methacrylate carrying silyl groups with an alkyl group containing 10 or more carbon atoms and (iii) an oxyalkylene polymer with reactive Si groups with a component B that comprises an amorphous powder having a particle size of 0.01 to 300 μm.

However, the above-described systems have a disadvantage in that in many cases the tensile strengths obtained with such compositions are borderline. Moreover, the effort required to incorporate polymers into the strength-giving structure of an adhesive is often laborious.

Thus, the object of the present invention is to provide compositions that do not exhibit the above-described disadvantages. In particular, an object of the present invention is to provide compositions that exhibit a high tensile strength. A further object of the present invention is to provide a manufacturing process for the inventive compositions.

It has now been discovered that compositions, particularly polyurethanes that are manufactured using a mixture of two or more polyols, do not exhibit the above-described disadvantages of the prior art. Concerning the inventive finding, it is particularly surprising that the used mixture of two or more polyols according to the invention is universally suited to impart a markedly improved tensile strength in the crosslinked state to crosslinking compositions, in particular based on crosslinked silyl groups or isocyanate groups.

DESCRIPTION OF THE INVENTION

Thus, the subject of the invention is a crosslinkable polymeric composition comprising at least one polymer with a number of reactive functional groups that under suitable conditions lead to crosslinking through themselves or with a suitable crosslinker, wherein the composition comprises either a) at least one polymer whose polymer backbone comprises at least two different oxyalkylene units $OX^1$ and $OX^2$, wherein at least a first oxyalkylene unit $OX^1$ possesses at least two carbon atoms between two neighboring oxygen atoms and at least one second oxyalkylene unit $OX^2$ possesses at least one more carbon atom between two neighboring oxygen atoms than the first oxyalkylene unit $OX^1$ or b) at least one first polymer whose polymer backbone possesses at least a first oxyalkylene unit $OX^1$ that possesses at least two carbon atoms between two neighboring oxygen atoms, and at least one second polymer whose polymer backbone comprises a second oxyalkylene unit $OX^2$ that possesses at least one more carbon atom between two neighboring oxygen atoms than the first oxyalkylene unit $OX^1$ in the first polymer or c) a mixture of the polymers according to a) and b), wherein the proportion by weight of the first oxyalkylene units $OX^1$ that possess at least two carbon atoms between two neighboring oxygen atoms and the second oxyalkylene units $OX^2$ that possess at least one more carbon atom between two neighboring oxygen atoms than the first oxyalkylene units $OX^1$ ranges from 10:90 to 90:10.

In the scope of the present invention a "composition" is understood to mean a mixture of two or more different substances. Thus in the scope of the present text, it is sufficient if a composition according to the present invention comprises, for example, a particular polymer type, which because of a polydispersity of greater than 1, comprises two or more different polymer molecules, wherein the polymer molecules differ through molecular weight or chemical composition or both.

In the scope of the present invention, an "oxyalkylene unit" is understood to mean a unit of the general formula —O—R—O—, wherein R stands for a linear or branched, saturated or unsaturated alkyl group having 2 to about 40 carbon atoms, a saturated or unsaturated cycloalkyl group having 4 to 18 carbon atoms or an aryl group having 6 to 24 carbon atoms, wherein the corresponding groups R can possess one or more substituents that in regard to the reactivity of the inventive composition with respect to the crosslinking of the functional groups, exert no perturbing or at least no more than an avoidable perturbing influence. An "oxyalkylene unit" according to the present invention can consist of an —O—R—O— sequence. However, according to the invention, it is also intended that an appropriate "oxyalkylene unit" possesses two or more of such sequences, in such cases they are considered in conventional terms as a "polyether". In the scope of the present invention, a sequence of two of the above-described oxyalkylene units is already described as a "polyether"; naturally, this is also valid for sequences of more than two of the oxyalkylene units shown above.

The polymer comprising the inventive composition possesses "a number of reactive functional groups that under suitable conditions lead to crosslinking through themselves or with a suitable crosslinker." In the scope of the present text, the term "crosslinking" is understood to mean the formation of a network in accordance with the pertinent definitions of polymer chemistry. Therefore, a polymer comprising an inventive composition must not necessarily possess more than two monofunctional crosslinkable groups that can be used for crosslinking. It is also possible that a polymer comprising an inventive composition possess only two of such monofunctional groups that can be crosslinked by the addition of a suitable crosslinker having a functionality of greater than two. A crosslinkable monofunctional group of this type is an isocyanate group, for example.

In addition, it is inventively possible and intended that a polymer comprising an inventive composition possess one or more crosslinkable polyfunctional functional groups. Suitable functional groups dispose, for example, of two or more potential, preferably covalent reactive sites, such that for example two such functional groups each with two reactive sites provide a total of 4 reactive sites in the polymer, such that with a total of two functional groups, crosslinking can result due to the polyfunctionality of the individual functional groups. In this sense, exemplary suitable functional groups are the silyl groups.

A "silyl group" in the scope of the present invention is understood to mean a functional group of the general formula I,

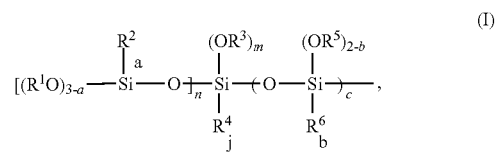

in which the groups $R^1$ to $R^6$, independently of one another, stand for a linear or branched, saturated or unsaturated hydrocarbon group with 1 to about 24 carbon atoms, a saturated or unsaturated cycloalkyl group with 4 to about 24 carbon atoms or an aryl group with 6 to about 24 carbon atoms, n, m and j each stand for a whole number from 0 to 3, wherein m+n+j=3, a stands for a whole number from 0 to 3, b for a whole number from 0 to 2 and c for a number from 0 to 8.

Fundamentally, an inventive composition can comprise polymers that carry essentially any functional group suitable for crosslinking. Appropriate functional groups can be located at any position in the polymer. Thus, for example, it is possible for appropriate functional groups to be located at the terminal positions of the polymer. However, it is also intended that appropriate functional groups be located in the polymer backbone at any of one or more positions or on side chains.

Fundamentally, appropriate functional groups can be all functional groups that on reacting with themselves or with a crosslinker can lead to crosslinking of the polymers comprised in the composition. Thus, crosslinking can be brought about by means of specific external conditions. Exemplary suitable external conditions can be by attaining a specific temperature, light, high-energy irradiation or the presence of a specific compound in the atmosphere, particularly the presence of moisture. Whereas, for example, crosslinking is usually achieved in the case of carboxylic groups or epoxy groups as the functional groups by raising the temperature or for the case of olefinically unsaturated double bonds for example by the action of light or other high-energy irradiation, in the scope of the present invention, preferred polymers are those which carry functional groups that crosslink under the influence of a substance emanating from the environment, particularly under the influence of water or under the influence of atmospheric humidity. In the scope of a preferred embodiment of the present invention, an inventive composition therefore comprises at least one polymer that carries either isocyanate groups or silyl groups or both as the reactive functional groups.

Fundamentally, any polymer types are suitable in the scope of the present invention. However, in the scope of a preferred embodiment of the present invention, an inventive composition comprises for example polyurethanes, polyethers or polyesters as the polymer.

The term "polyurethane" stands here for a defined polyurethane structure, as is obtained from a targeted one-step or multi-step polyurethane synthesis. The term includes all variations of this structure, as they result from the statistical nature of the polyaddition process.

In the scope of a first embodiment of the present invention, an inventive composition comprises at least one polymer whose polymer backbone comprises at least two different oxyalkylene units $OX^1$ and $OX^2$ wherein at least a first oxyalkylene unit $OX^1$ possesses at least two carbon atoms between two neighboring oxygen atoms and at least one second oxyalkylene unit $OX^2$ possesses at least one more carbon atom between two neighboring oxygen atoms than the first oxyalkylene unit $OX^1$.

In accordance with the previously cited definition of the term "oxyalkylene unit" in the scope of this text, the oxyalkylene units $OX^1$ and $OX^2$ therefore differ at least in that the group R in $OX^2$ possesses at least 2 carbon atoms more than the group R in $OX^1$. A requirement for obtaining the inventive effect is that the groups R in $OX^1$ und $OX^2$ not only differ in the overall number of carbon atoms, but that the number of the carbon atoms in direct and end to end linkage between directly neighboring oxygen atoms of the oxyalkylene unit differs by at least 1 carbon atom.

In the scope of a preferred embodiment of the present invention, the difference in the number of carbon atoms between directly neighboring oxygen atoms of the oxyalkylene unit in direct and end to end linkage is at least 2.

In the scope of the present invention, a polymer comprised in an inventive composition can be constructed in such a way that in regard to the oxyalkylene units, it fulfills the above-cited conditions within each polymer chain, i.e. within each polymer molecule. However, according to the invention it is also intended that an inventive composition comprises at least one first polymer whose polymer backbone possesses at least a first oxyalkylene unit $OX^1$ that possesses at least two carbon atoms between two neighboring oxygen atoms, and at least one second polymer whose polymer backbone comprises a second oxyalkylene unit $OX^2$ that possesses at least one more carbon atom between two neighboring oxygen atoms than the first oxyalkylene unit $OX^1$ in the first polymer.

Moreover, in the scope of the present invention it is possible that an inventive composition comprises at least one polymer whose polymer backbone comprises at least two different oxyalkylene units $OX^1$ and $OX^2$, wherein at least a first oxyalkylene unit $OX^1$ possesses at least two carbon atoms between two neighboring oxygen atoms and at least one second oxyalkylene unit $OX^2$ that possesses at least one more carbon atom between two neighboring oxygen atoms than the first oxyalkylene unit $OX^1$ and comprises at least a first polymer whose polymer backbone possesses a first oxyalkylene unit $OX^1$ that possesses at least two carbon atoms between two neighboring oxygen atoms and comprises at least one second polymer whose polymer backbone comprises at least one second oxyalkylene unit $OX^2$ that possesses at least one more carbon atom between two neighboring oxygen atoms than the first oxyalkylene unit $OX^1$ in the first polymer.

In order to achieve the inventive effect it is additionally critical that the proportion by weight of the first oxyalkylene units $OX^1$ that possess at least two carbon atoms between two neighboring oxygen atoms and the second oxyalkylene units $OX^2$ that possess at least one more carbon atom between two neighboring oxygen atoms than the first oxyalkylene units $OX^1$ ranges from about 10:90 to about 90:10. In the scope of the present invention, it has additionally transpired that a ratio of about 20:80 to about 80:20 or about 30:70 to about 70:30 or about 40:60 to about 60:40, for example 50:50, is suitable, depending on the polymers comprised in the inventive composition. Preferably, in the scope of the present invention however, polymers or polymer mixtures are used in which the ratio $OX^1$ to $OX^2$ is chosen such that it is of more than 1:1, preferably about 1.1:1 to about 8.5:1 or about 1.2:1 to about 8:1 or about 1.5:1 to about 5:1 or about 2:1 to 4:1.

In so far as they are comprised together in the polymer backbone of a specific polymer, the oxyalkylene units $OX^1$ and $OX^2$ can be present in essentially any sequence. However it is preferred according to the invention that for the case in which the polymer backbone comprises at least one polymer of at least two different oxyalkylene units $OX^1$ and $OX^2$, the oxyalkylene units are disposed either statistically or
in blocks according to the scheme

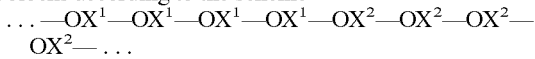

or
in blocks according to the scheme

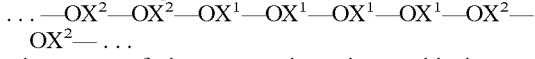

In the scope of the present invention, a block configuration of the oxyalkylene units according to the scheme ... —$OX^1$—$OX^1$—$OX^1$—$OX^1$—$OX^2$—$OX^2$—$OX^2$—$OX^2$— ... does not mean that the oxyalkylene units in the inventively used polymers must actually be covalently bonded to one another in the sense of the above scheme. The above scheme only serves to illustrate the sequence of the oxyalkylene units in the polymer, wherein a covalent bond can be between each of the individual oxyalkylene units, but not necessarily. According to the invention, it is also possible that a molecular structure exists between individual oxyalkylene units or between individual blocks of the same or different oxyalkylene units, as for example occurs during a synthetic reaction to prepare a polymer. Suitable structures that can occur between individual oxyalkylene units or blocks of oxyalkylene units are for example structures resulting from the polycondensation or polyaddition of known monomeric or polymeric units; these can be particularly ester bonds or urethane bonds. Thus, for example, the linkage of two oxyalkylene units can result from the fact that corresponding oxyalkylene units with OH-groups are reacted with diisocyanates. In this manner a linkage is produced between two oxyalkylene units, which results from over a two or on groups of featured structure. Corresponding structures will be described in more detail in the scope of the present text.

An inventive composition can be manufactured by essentially any method known to the expert. However, it has been shown that processes such as those described in more detail in the following text, lead to particularly good results.

Accordingly, the subject of the present invention is also a crosslinkable polymeric composition manufactured by the reaction of at least two components A and B, wherein a) as component A, an isocyanate or a polyisocyanate or a mixture of two or more isocyanates or two or more polyisocyanates or an isocyanate and a polyisocyanate or a mixture of two or more isocyanates with two or more polyisocyanates and b) as component B a mixture of two or more polyols is used, wherein component B comprises at least two polyols with oxyalkylene units $OX^1$ and $OX^2$, wherein $OX^2$ possesses at least one more carbon atom between two neighboring oxygen atoms than $OX^1$ and the mixing ratio of both polyols with oxyalkylene units $OX^1$ and $OX^2$ is 10:90 to 90:10, based on weight.

Essentially, the inventive composition can be manufactured by reacting an isocyanate or a polyisocyanate or their mixture, as described above, with a mixture of two or more polyols according to the above-described definition.

In the scope of the present invention, a polyisocyanate or a mixture of two or more polyisocyanates for example is used as component A. Fundamentally, all compounds that possess two or more isocyanurate groups are therefore suitable for manufacturing the inventive polyisocyanates. Polyisocyanates are understood to mean compounds that have at least two isocyanate groups (NCO-groups). Examples of these compounds have the general structure O=N=C—Z—C=N=O, wherein Z is a linear or branched aliphatic, alicyclic or aromatic hydrocarbon group that optionally has further inert substituents or substituents that can participate in the reaction. Therefore, such compounds can be monomeric compounds, for example polyisocyanates. However, according to the invention, a compound, which is obtained from the reaction of appropriate precursors, particularly from the reaction of polyisocyanates with polyols or polyamines, may also be used as the compound with two or more isocyanurate groups. For example, in the scope of the present invention, a polyurethane prepolymer or a mixture of two or of them is used as the compound with two or more isocyanate groups, prepared by treating a polyisocyanate or a mixture of two or more polyisocyanates with a polyol or a mixture of two or more polyols or a polyamine or a mixture of two or more polyamines.

Exemplary polyisocyanates used according to the invention as the component A include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3 and -1,4-diisocyanate, bis(2-isocyanato-ethyl) fumarate, as well as mixtures of two or more thereof, 1-isocyanato-3,3,5-trimethyl-5-isocyanatomethylcyclohexane (isophorone diisocyanate, IPDI), 2,4- and 2,6-hexahydrotoluene diisocyanate, hexahydro-1,3- or -1,4-phenylene diisocyanate, benzidine diisocyanate, naphthaline-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluene diisocyanate (TDI), 2,4'-diphenylmethane diisocyanate, 2,2'-diphenylmethane diisocyanate or 4,4'-diphenylmethane diisocyanate (MDI) or their partially or completely hydrogenated cycloalkyl derivatives, for example completely hydrogenated MDI ($H_{12}$-MDI), alkyl substituted diphenylmethane diisocyanates, for example mono-, di-, tri- or tetraalkyldiphenylmethane diisocyanates as well as their partially or completely hydrogenated cycloalkyl derivatives, 4,4'-diisocyanatophenylperfluorethane, phthalic acid bis-isocyanatoethyl ester, 1-chloromethylphenyl-2,4- or -2,6-diisocyanates, 1-bromomethylphenyl-2,4- or -2,6-diisocyanates, 3,3-bis-chloromethyl ether-4,4'-diphenyl diisocyanates, sulfur-containing diisocyanates, as are obtained by treating 2 mol diisocyanate with 1 mol of thiodiglycol or dihydroxydihexylsulfide, the di- und triisocyanates of the di- and trimer fatty acids, or mixtures of two or more of the cited diisocyanates.

The mixtures of the structural isomers of diisocyanatotoluene are important, in particular the mixture of 80 mol % 2,4-diisocyanatotoluene and 20 mol % 2,6-diisocyanatotoluene are particularly suitable as mixtures of these isocyanates. In addition, the mixtures of aromatic isocyanates, like 2,4-diisocyanatotoluene and/or 2,6-diisocyanatotoluene with aliphatic or cycloaliphatic isocyanates like hexamethylene diisocyanate or IPDI are particularly advantageous, the preferred mix ratio of the aliphatic to the aromatic isocyanates being about 4:1 to 1:4.

Also, in the sense of the present invention, suitable polyisocyanates for manufacturing the component A are tri or higher functional isocyanates, such as are obtained, for example by oligomerizing diisocyanates, in particular by oligomerizing the above cited isocyanates. Examples of such tri or higher functional polyisocyanates are the triisocyanurates of HDI or IPDI or their mixtures or their mixed triisocyanurates as well as polyphenylmethylene polyisocyanate, as is obtained by phosgenating aniline formaldehyde condensation products.

In the scope of the present invention, if a polymer is comprised in an inventive composition that was manufactured using a polyurethane prepolymer, then according to the invention such polyurethane prepolymers are preferably used that are obtained from the reaction of a polyisocyanate or a mixture of two or more polyisocyanates with a compound having at least two active hydrogen atoms or a mixture of two or more such compounds.

As compound having at least two active hydrogen atoms, in the context of the present invention, compounds having two or more OH-groups (polyols), compounds having an amino group or two or more optionally totally or partially monosubstituted amino groups, compounds having at least two carboxylic acid groups or compounds having at least two mercapto groups, or mixtures of two or more thereof are particularly used. In the scope of the present invention, polyurethane prepolymers that were prepared using polyols or polyamines are particularly preferred.

Accordingly, polyurethane prepolymers that are suitable as component A or as ingredients of component A in the scope of the present invention can be manufactured by using a polyol or a mixture of two or more polyols in the polyurethane synthesis in the scope of the present invention.

The term "polyol" in the scope of the present invention includes a compound that possesses at least two OH-groups, independently of whether the compound possesses additional functional groups. Preferably however, a polyol in the scope of the present invention includes only OH-groups as the functional groups or, if additional functional groups are present, then all the additional functional groups are non-reactive towards isocyanates, at least under the conditions prevailing in the reaction of polyisocyanate and polyol.

Exemplary suitable polyols are polyester polyols known e.g. from Ullmanns Encyclopedia of Technical Chemistry, $4^{th}$ edition, vol. 19, p. 62-65. The used polyester polyols are preferred that are obtained by treating dihydric alcohols with polyfunctional, preferably difunctional polycarboxylic acids. The polycarboxylic acids can be aliphatic, cycloaliphatic, araliphatic, aromatic or heterocyclic and optionally e.g. substituted by halogen atoms and/or unsaturated. Examples of these are suberic acid, azelaic acid, phthalic acid, isophthalic acid, phthalic anhydride, tetrahydrophthalic anhydride, endomethylenetetrahydrophthalic anhydride, glutaric anhydride, maleic acid, maleic anhydride, fumaric acid and/or dimeric fatty acids.

To manufacture the component A, the cited polycarboxylic acids can either be used singly as the sole acid component or as a mixture. Carboxylic acids of the general formula HOOC—$(CH_2)_y$—COOH are preferred, wherein y is a number from 1 to 20, preferably an even number from 2 to 20, e.g. succinic acid, adipic acid, dodecanedioic acid and sebacic acid. Instead of the free polycarboxylic acids, the corresponding polycarboxylic anhydrides or the corresponding polycarboxylic acid esters of lower alcohols or their mixtures can also be used to manufacture the polyester polyols.

The polyhydric alcohols used for the reaction with polycarboxylic acids to form component A include e.g. ethylene glycol, propane-1,2-diol, propane-1,3-diol, butane-1,3-diol, butene-1,4-diol, butyne-1,4-diol, pentane-1,5-diol, hexane-1,6-diol, neopentyl glycol, bis-(hydroxymethyl)cyclohexanes, like 1,4-bis(hydroxymethyl)cyclohexane, 2-methyl-propane-1,3-diol, methylpentanediols, as well as diethylene glycol, triethylene glycol, tetraethylene glycol, polyethylene glycol, dipropylene glycol, polypropylene glycols, dibutylene glycol and polybutylene glycol. Neopentyl glycol and alcohols of the general formula HO—$(CH_2)_x$—OH are preferred, wherein x is a number from 1 to 20, preferably an even number from 2 to 20. Examples of these are ethylene glycol, butane-1,4-diol, hexane-1,6-diol, octane-1,8-diol and dodecane-1,12-diol.

Furthermore, polycarbonate diols can also be considered as polyols, such as for example those obtained by treating phosgene with an excess of the low molecular weight alcohols cited as components used to make the polyester polyols.

Polyester diols based on lactone are also suitable as polyols, such as homo or mixed polymers of lactones, preferably products possessing terminal hydroxy groups from the addition of lactones on suitable difunctional starter molecules. Examples of suitable lactones include ε-caprolactone, β-propiolactone, γ-butyrolactone and/or methyl-ε-caprolactone as well as their mixtures. Suitable starter components are e.g. the previously cited low molecular weight alcohols used as components to make the polyester polyols. Low molecular weight polyester diols or polyether diols can also be used as starters to manufacture the lactone polymers. Instead of lactone polymers, the corresponding chemically equivalent polycondensates obtained from the hydroxycarboxylic acids that correspond to the lactones can be used.

The polyester polyols can also be made with the help of minor amounts of mono and/or higher functional monomers.

Similarly suitable polyol components are polyacrylates having OH-groups, which are obtained for example by polymerizing ethylenically unsaturated monomers that contain an OH-group. Such monomers are obtained, for example, from the esterification of ethylenically unsaturated carboxylic acids with dihydric alcohols, the alcohol being present generally in slight excess. For this, suitable exemplary unsaturated carboxylic acids are acrylic acid, methacrylic acid, crotonic acid or maleic acid. Suitable exemplary esters that have OH-groups are 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

In addition, polyether diols or polyether polyols are also considered as polyols. They are obtained particularly by polymerization of propylene oxide, butylene oxide, tetrahydrofuran, styrene oxide or epichlorohydrin with themselves, e.g. in the presence of $BF_3$ or by the addition of these compounds in mixtures or sequentially onto starter components having active hydrogen atoms, such as water, alcohols or amines, e.g. propane-1,2-diol, propane-1,3-diol, 1,2-bis(4-hydroxydiphenyl)propane or aniline.

Alcohols having a functionality of more than two can be used in minor amounts for the manufacture of both polyester polyols and polyether polyols. In particular, examples of these compounds that are used are trimethylol propane, pentaerythritol, glycerin, sugars, such as glucose, oligomerized polyols such as for example dimeric or trimeric ethers of trimethylol propane, glycerin or pentaerythritol, partially esterified polyhydric alcohols of the types described above, such as for example partially esterified trimethylol propane, partially esterified glycerin, partially esterified pentaerythritol, partially esterified polyglycerin and the like, wherein monofunctional aliphatic carboxylic acids are preferably used for the esterification. Optionally, the hydroxy groups of the polyols can be etherified by treatment with alkylene oxides. The above-described compounds are also suitable starting components for making the polyether polyols.

Preferably, the polyol compounds having a functionality >2 are only employed in minor amounts for making the polyester polyols or polyether polyols.

Polyhydroxyolefins are also suitable polyols, preferably those with two terminal hydroxy groups, e.g. α,ω-dihydroxypolybutadiene, α,ω-dihydroxypolymethacrylate esters or α,ω-dihydroxypolyacrylate esters.

The above-described short-chain alkanediols are also used as additional polyols, wherein neopentyl glycol and the non-branched diols with 2 to 12 carbon atoms e.g. propylene glycol, 1,4-butanediol, 1,5-pentanediol or 1,6-hexanediol are preferred.

The enumerated suitable polyols can also be used as mixtures in any proportions.

In the scope of the present invention, polyamines are also suitable for manufacturing appropriate polyurethane prepolymers. Polyethers having terminal amino groups or polymeric compounds that possess one or more amino or imino groups are suitable examples for this. Suitable polyamines can also be compounds having more than difunctionality, which have at least one primary or secondary amino group or when there is more than one amino group per molecule, they can also have both primary and secondary amino groups. Examples of these compounds are hydrazine, ethylene diamine, 1,2- and 1,3-propylenediamine, butylenediamines, pentamethylenediamines, hexamethylenediamines such as 1,6-hexamethylenediamine, alkylhexamethylenediamine such as 2,4-dimethylhexamethylenediamine, alkylenediamines in general having up to about 44 carbon atoms, wherein also cyclic or polycyclic alkylenediamines can be used such as for example those that can be obtained in the known manner from the dimerization products of unsaturated fatty acids. Aromatic diamines such as for example 1,2-phenylenediamine, 1,3-phenylenediamine or 1,4-phenylenediamine can also be used, but are not preferred. Furthermore, higher amines such as e.g. diethylenetriamine, aminomethyl-1,8-diaminooctane and triethylenetetramine can be used in the scope of the invention.

In addition to the amino groups, the corresponding amino compounds can have additional functional groups, particularly groups that are reactive towards isocyanates. These particularly include the hydroxy group or the mercapto group.

Low molecular weight amino compounds that optionally have one or more further groups that are reactive towards isocyanate groups are also examples of suitable polyamines in the scope of the invention. For example, these are monoamino alcohols having an aliphatically bonded hydroxyl group such as ethanolamine, N-methylethanolamine, N-ethylethanolamine, N-butylethanolamine, N-cyclohexylethanolamine, N-tert.-butylethanolamine, leucinol, isoleucinol, valinol, prolinol, hydroxyethylaniline, 2-(hydroxymethyl)piperidine, 3-(hydroxymethyl)piperidine, 2-(2-hydroxyethyl)piperidine, 2-amino-2-phenylethanol, 2-amino-1-phenylethanol, ephedrine, p-hydroxyephedrine, norephedrine, adrenalin, noradrenalin, serine, isoserine, phenylserine, 1,2-diphenyl-2-aminoethanol, 3-amino-1-propanol, 2-amino-1-propanol, 2-amino-2-methyl-1-propanol, isopropanolamine, N-ethylisopropanolamine, 2-amino-3-phenylpropanol, 4-amino-1-butanol, 2-amino-1-butanol, 2-aminoisobutanol, neopentanolamine, 2-amino-1-pentanol, 5-amino-1-pentanol, 2-ethyl-2-butyl-5-aminopentanol, 6-amino-1-hexanol, 2-amino-1-hexanol, 2-(2-aminoethoxy)ethanol, 3-(aminomethyl)-3,5,5-trimethylcyclohexanol, 2-aminobenzyl alcohol, 3-aminobenzyl alcohol, 3-amino-5-methylbenzyl alcohol, 2-amino-3-methylbenzyl alcohol.

When the use of polyols or polyamines is intended for example to produce chain branching, then e.g. monoamino polyols having two aliphatically bound hydroxyl groups can be used, such as 1-amino-2,3-propanediol, 2-amino-1,3-propanediol, 2-amino-2-methyl-1,3-propanediol, 2-amino-2-ethyl-1,3-propanediol, 2-amino-1-phenyl-1,3-propanediol, diethanolamine, diisopropanolamine, 3-(2-hydroxyethylamino)propanol and N-(3-hydroxypropyl)-3-hydroxy-2,2-dimethyl-1-amino groups.

In the scope of the present invention, if a polyurethane prepolymer is used as component A, then this type of polyurethane prepolymer does not usually possess a sequence of oxyalkylene units $OX^1$ and $OX^2$ as is required in the context of the present text. If an appropriate polyurethane prepolymer possesses such a sequence of oxyalkylene units $OX^1$ and $OX^2$ then it is already a polymer as is present in an inventive composition. Such a polyurethane prepolymer then possesses an appropriate sequence of oxyalkylene units $OX^1$ and $OX^2$ as is required in accordance with the invention. Moreover, an appropriate polyurethane prepolymer possesses NCO-end groups that in the presence of a suitable crosslinker, for example in the presence of a more than dihydric polyol, are crosslinkable.

In the scope of the present invention, as described above, it is possible to use a compound having two or more isocyanate groups as the component A. However, according to the invention it is likewise possible and intended that the component A consists exclusively of compounds that have at least one silyl group according to the above definition and at least one isocyanate group. In addition, according to the invention it is possible that the component A consists partially of compounds that have at least one silyl group according to the above definition and at least one isocyanate group, wherein the residual part can consist of polyisocyanates, for example. When the latter compounds are used as the ingredient of component A or if the component A consists of these type of compounds, then inventive compositions are obtained that comprise polymers having one or more silyl end groups.

In the scope of the present invention, it is thus intended that an isocyanate having at least one silyl group be used as the isocyanate. Silanes incorporating isocyanate groups that are suitable for the component A or as constituents of component A are, for example methyldimethoxysilylmethyl isocyanate, trimethoxysilylmethyl isocyanate, diethylmethoxysilylmethyl isocyanate, ethyldimethoxysilylmethyl isocyanate, methyldiethoxysilylmethyl isocyanate, triethoxysilylmethyl isocyanate, ethyldiethoxysilylmethyl isocyanate, methyldimethoxysilylethyl isocyanate, trimethoxysilylethyl isocyanate, ethyldimethoxysilylethyl isocyanate, methyldiethoxysilylethyl isocyanate, triethoxysilylethyl isocyanate, ethyldiethoxysilylethyl isocyanate, methyldimethoxysilylpropyl isocyanate, trimethoxysilylpropyl isocyanate, ethyldimethoxysilylpropyl isocyanate, methyldiethoxysilylpropyl isocyanate, triethoxysilylpropyl isocyanate, ethyldiethoxysilylpropyl isocyanate, methyldimethoxysilylbutyl isocyanate, trimethoxysilylbutyl isocyanate, triethylsilylbutyl isocyanate, diethylmethoxysilylbutyl isocyanate, ethyldimethoxysilylbutyl isocyanate, methyldiethoxysilylbutyl isocyanate, triethoxysilylbutyl isocyanate, diethylethoxysilylbutyl isocyanate, ethyldiethoxysilylbutyl isocyanate, methyldimethoxysilylpentyl isocyanate, trimethoxysilylpentyl isocyanate, triethylsilylpentyl isocyanate, ethyldimethoxysilylpentyl isocyanate, methyldiethoxysilylpentyl isocyanate, triethoxysilylpentyl isocyanate, diethylethoxysilylpentyl isocyanate, ethyldiethoxysilylpentyl isocyanate, methyldimethoxysilylhexyl isocyanate, trimethoxysilylhexyl isocyanate, ethyldimethoxysilylhexyl isocyanate, ethyldiethoxysilylhexyl isocyanate, γ-trimethoxysilylhexyl isocyanate, ethyldiethoxysilylhexyl isocyanate, γ-trimethoxysiloxydimethylsilylpropyl isocyanate, γ-trimethylsiloxydimethoxysilylpropyl isocyanate, γ-triethoxysiloxydiethylpropyl isocyanate, γ-triethoxysiloxydiethoxysilylpropyl isocyanate, or mixtures of two or more thereof.

Therefore, inventive compositions that comprise polymers in accordance with the above definitions are obtained as a result of carrying out the above process. Appropriate polymers in the scope of the above operating instruction possess either one isocyanate group or two or more isocyanate groups or one silyl group or two or more silyl groups or one isocyanate group or two or more isocyanate groups and one silyl group or one isocyanate group and one silyl group or two or more silyl groups or two or more isocyanate groups and two or more silyl groups, in accordance with the above definition.

Whereas the manufacturing technique described above affords compositions that exhibit an essentially statistical constitution or because of the different reactivity of the oxyalkylene units possibly an at least partial block structure, in the scope of the present invention crosslinkable compositions can also be manufactured that possess a sequence of oxyalkylene units that differ from these.

Accordingly, the present invention also relates to a crosslinkable polymeric composition producible by the reaction of at least three components A, C and D, wherein a) as component A, an isocyanate or a polyisocyanate or a mixture of two or more isocyanates or two or more polyisocyanates or an isocyanate and a polyisocyanate or a mixture of two or more isocyanates with two or more polyisocyanates and b) as component C a polyol with oxyalkylene units $OX^1$ and c) as component D a polyol with oxyalkylene units $OX^2$ are used, wherein the reaction is carried out in two or more steps and in a first step component A is reacted totally or partially with the whole of component C or a part of component C or with the whole of component D or a part of component D, and in a second step, the reaction product, depending on the end groups and the reaction control in the first step, is reacted with the total remaining component A or a part of the remaining component A or with the total remaining component C or a part of the remaining component C or with the total remaining component D or a part of the remaining component D, and, depending on the reaction control in the first or second step, the remaining components A, C and D are subsequently reacted in one or more additional steps with reaction products from the respective previous steps until the reactants are used up, wherein $OX^2$ possesses at least one more carbon atom between two neighboring oxygen atoms than $OX^1$ and the mixing ratio of both polyols with oxyalkylene units $OX^1$ and $OX^2$ in the crosslinkable polymer is 10:90 to 90:10, based on weight.

According to the process described here, compositions comprising polymers are obtained that possess the oxyalkylene units $OX^1$ and $OX^2$ whose sequences can be essentially freely selected by the sequence of reaction steps with component C and component D. Also, for the case of the process described here, isocyanates having silyl groups according to the above definition can be used as the component A.

In order to introduce oxyalkylene units $OX^1$ and $OX^2$, essentially any compounds known to the expert can be used in the scope of the present invention.

The essentially low molecular weight compounds that are used to introduce the oxyalkylene units $OX^1$ and $OX^2$ include for example ethylene glycol, propane-1,2-diol, propane-1,3-diol, butane-1,3-diol, butene-1,4-diol, butyne-1,4-diol, pentane-1,5-diol, hexane-1,6-diol, neopentyl glycol, bis(hydroxymethyl)cyclohexanes, like 1,4-bis(hydroxymethyl)cyclohexane, 2-methyl-propane-1,3-diol, methylpentane diols, as well as diethylene glycol, triethylene glycol, tetraethylene glycol, polyethylene glycol, dipropylene glycol, polypropylene glycols, dibutylene glycol and polybutylene glycol. Neopentyl glycol and alcohols of the general formula $HO-(CH_2)_x-OH$ are preferred, wherein x is a number from 1 to 20, preferably an even number from 2 to 20. Examples of these are ethylene glycol, butane-1,4-diol, hexane-1,6-diol, octane-1,8-diol and dodecane-1,12-diol.

Moreover, in the scope of the present invention, polymeric compounds are suitable, particularly polyether diols or polyether polyols. They are obtained in particular by the polymerization of propylene oxide, butylene oxide, tetrahydrofuran, styrene oxide or epichlorohydrin with themselves, e.g. in the presence of $BF_3$ or by the addition of these compounds in mixtures or sequentially onto starter components having active hydrogen atoms, such as water, alcohols or amines, e.g. propane-1,2-diol, propane-1,3-diol, 1,2-bis(4-hydroxydiphenyl)propane or aniline.

In the scope of the present invention, compounds that possess two carbon atoms between two neighboring oxygen atoms are particularly preferred as oxyalkylene units $OX^1$. In particular they are the reaction products of an appropriate reaction of propylene oxide, butylene oxide, tetrahydrofuran, styrene oxide or epichlorohydrin with themselves, e.g. in the presence of $BF_3$ or by the addition of these compounds in mixtures or sequentially onto starter components having active hydrogen atoms, such as water, alcohols or amines. Compounds like butane-1,3-diol, butene-1,4-diol, butyne-1,4-diol, pentane-1,5-diol, hexane-1,6-diol, neopentyl glycol, bis(hydroxymethyl)cyclohexanes, like 1,4-bis(hydroxymethyl)cyclohexane, methylpentanediols, dibutylene glycol and polybutylene glycol are particularly suitable as oxyalkylene units $OX^2$. Alcohols of the general formula HO—$(CH_2)_x$—OH are preferred, wherein x is a number from 4 to 20, preferably an even number from 4 to 20. In the scope of the present invention, polypropylene glycol is particularly preferred as the oxyalkylene unit $OX^1$ and the polymerization product of tetrahydrofuran as the oxyalkylene unit $OX^2$.

When polymeric compounds are used as the oxyalkylene units $OX^1$ and $OX^2$, it has proved valuable in the context of a preferred embodiment of the present invention when compounds that contribute to the formation of the oxyalkylene unit $OX^1$ exhibit a higher molecular weight than compounds that contribute to the formation of the oxyalkylene unit $OX^2$. In the scope of the present invention, it is particularly preferred that an inventive composition comprises a polymer with oxyalkylene units $OX^1$ and $OX^2$ or a mixture of two or more polymers with oxyalkylene units $OX^1$ and $OX^2$, wherein the number average molecular weight $(M_w)$ of the oxyalkylene units $OX^1$ and $OX^2$ exhibit a ratio of about 1.2:1 to about 40:1, for example about 1.3:1 to about 30:1 or about 1.5:1 to about 20.1 or about 1.8:1 to about 15:1 or about 2:1 to about 12.1 or about 3:1 to about 10:1 or about 4:1 to about 9:1 or about 5:1 to about 8:1 or about 6:1 to about 7:1. The determination of molecular weights was carried out by means of methods well known to the expert, for example by viscosity measurement, light scattering, membrane osmometry or gel permeation chromatography (GPC) in a manner known to the expert.

Further, in the scope of a preferred embodiment of the present invention, it has proved valuable when compounds that contribute to the formation of the oxyalkylene unit $OX^1$ exhibit a molecular weight of about 1000 to about 100 000, while compounds that contribute to the formation of the oxyalkylene unit $OX^2$ exhibit a molecular weight of about 200 to about 50 000. In the scope of the present invention, it is particularly preferred that an inventive composition comprises a polymer with oxyalkylene units $OX^1$ and $OX^2$ or a mixture of two or more polymers with oxyalkylene units $OX^1$ and $OX^2$, wherein the number average molecular weights $(M_w)$ of the oxyalkylene units $OX^1$ are about 2000 to about 40 000, for example about 3000 to about 30 000, or about 4000 to about 25 000 or about 5000 to about 20 000 or about 6000 to about 19 000 or about 7000 to about 18 000 or about 8000 to about 15 000 or about 9000 to about 12 000 and the number average molecular weights $(M_w)$ of the oxyalkylene units $OX^2$ are about 200 to about 30 000, for example about 500 to about 10 000 or about 600 to about 7000 or about 700 to about 5000 or about 800 to about 4000 or about 900 to about 3500 or about 1000 to about 3000. The determination of the molecular weights was again carried out by means of methods known to the expert, for example by viscosity measurement, light scattering, membrane osmometry or gel permeation chromatography (GPC) in a manner known to the expert.

According to a preferred embodiment of the present invention, the compounds that contribute to the formation of the oxyalkylene unit $OX^1$ possess a molecular weight of 7000 to 100 000, particularly preferably from 10 000 to 100 000, quite particularly preferably from 20 000 to 100 000. These molecular weights are particularly advantageous, as the polymers manufactured with them exhibit a markedly higher elasticity at a simultaneous high tensile strength. A further advantage of this is that by selecting such compounds with a longer chain length, fewer hydrogen-bonding urethane units are present, with the result that the corresponding polymer has a lower viscosity. Moreover, it transpires that by adding the above-described longer chain compounds having molecular weights of more than 7000, particularly more than 10 000, above all more than 20 000, the content of silane end groups can be kept low. In this way the polymers—in spite of the above-described lower viscosity—have higher molecular weights, the degrees of crosslinking are lower and hence the mechanical properties of the polymer are improved, such as e.g. the elasticity and elongation at break at an equivalent high tensile strength value. Moreover, in some cases the addition of such longer chain compounds results in better green strength, as during the polymerization, a high molecular weight is reached significantly faster.

A further advantage resulting from a lower number of silane groups is a somewhat improved cure because due to the lower density of silane groups, less water is required for curing.

For the case where an isocyanate carrying silyl groups is used as the isocyanate in component A, the inventive composition includes polymers with silyl groups. However, it is also possible according to the invention to obtain inventive silyl group-containing polymers when an above-described isocyanate group-containing polymer reaction product, for example a reaction product of components A and B, or a reaction product of components A, C and D is reacted with an amine carrying silyl groups. In the context of the present text, a corresponding process and suitable amine carrying silyl groups are discussed in more detail below.

In the scope of a preferred embodiment of the present invention for the manufacture of the inventive compositions, prepolymers carrying isocyanate groups are reacted with amines carrying silyl groups to afford the inventive compositions.

Fundamentally, the inventive compositions can be manufactured by any process known to the expert. However, it has been demonstrated that the following described process is particularly well suited for manufacturing the inventive compositions.

Accordingly, the subject of the present invention is also a process for manufacturing a crosslinkable polymeric composition, in which
a) at least one polymer whose polymer backbone comprises at least two different oxyalkylene units $OX^1$ and $OX^2$, wherein at least a first oxyalkylene unit $OX^1$ possesses at least two carbon atoms between two neighboring oxygen atoms, and at least one second oxyalkylene unit $OX^2$ possesses at least one more carbon atom between two neighboring oxygen atoms than the first oxyalkylene unit $OX^1$, with a number of reactive functional groups that under suitable conditions lead to crosslinking through themselves or with a suitable crosslinker, or b) at least one first polymer whose polymer backbone possesses at least a first oxyalkylene unit $OX^1$ that possesses at least two carbon atoms between two neighboring oxygen atoms, and at least one second polymer whose polymer backbone comprises a second oxyalkylene unit $OX^2$ that possesses at least one more carbon atom between two neighboring oxygen atoms than the first oxyalkylene unit $OX^1$ in the first polymer are provided separately with a number of reactive functional groups that under suitable conditions lead to crosslinking through themselves or with a suitable crosslinker and subsequently blended together, wherein the weight ratio of the first oxyalkylene unit $OX^1$ to the second oxyalkylene unit $OX^2$ is 10:90 to 90:10.

In addition, the present invention relates to a process for manufacturing a crosslinkable polymeric composition in which at least two components A and B are reacted together, wherein a) as component A, an isocyanate or a polyisocyanate or a mixture of two or more isocyanates or two or more polyisocyanates or an isocyanate and a polyisocyanate or a mixture of two or more isocyanates with two or more polyisocyanates and b) as component B a mixture of two or more polyols is used, wherein component B comprises at least two polyols with oxyalkylene units $OX^1$ c) and $OX^2$, wherein $OX^2$ possesses at least one more carbon atom between two neighboring oxygen atoms than $OX^1$ and the mixing ratio of both polyols with oxyalkylene units $OX^1$ and $OX^2$ is 10:90 to 90:10, based on weight and the ratio of the components A and B is chosen in such a way that the composition possesses a number of reactive functional groups that under suitable conditions lead to crosslinking through themselves or with a suitable crosslinker.

As has already been mentioned above in the context of the present text, an isocyanate carrying at least one silyl group can be used as the isocyanate in the inventive process.

Likewise, the subject of the present invention is a process for manufacturing a crosslinkable polymeric composition in which at least three components A, C and D are reacted together, wherein a) as component A, an isocyanate or a polyisocyanate or a mixture of two or more isocyanates or two or more polyisocyanates or an isocyanate and a polyisocyanate or a mixture of two or more isocyanates with two or more polyisocyanates and b) as component C a polyol with oxyalkylene units $OX^1$ and c) as component D a polyol with oxyalkylene units $OX^2$ is used, wherein the reaction is carried out in two or more steps and in a first step component A is reacted totally or partially with the whole of component C or a part of component C or with the whole of component D or a part of component D, and in a second step, the reaction product, depending on the end groups and the reaction control in the first step, is reacted with the total remaining component A or a part of the remaining component A or with the total remaining component C or a part of the remaining component C or with the total remaining component D or a part of the remaining component D, and, depending on the reaction control in the first or second step, the remaining components A, C and D are subsequently reacted in one or more additional steps with reaction products from the respective previous steps until the reactants are used up, wherein $OX^2$ possesses at least one more carbon atom between two neighboring oxygen atoms than $OX^1$ and the mixing ratio of both polyols with oxyalkylene units $OX^1$ and $OX^2$ in the crosslinkable polymer is 10:90 to 90:10, based on weight, and the ratio of the components A, C and D is chosen in such a way that the composition possesses a number of reactive functional groups that under suitable conditions lead to crosslinking through themselves or with a suitable crosslinker.

As for the previous process, an isocyanate carrying at least one silyl group can be used as the isocyanate.

A polymer, manufactured in the scope of an inventive process or in the scope of a process described in the above text, as is present in the inventive composition as a constituent of this composition, possesses a suitable type and number of functional groups for crosslinking the crosslinkable polymers comprised in the composition. Suitable functional groups have likewise already been described in the scope of the present text. It has proved to be preferable if an inventive composition comprises polymers that comprise either isocyanate groups or silyl groups as crosslinkable functional groups according to the abovementioned definition. The manufacture of appropriate polymers carrying isocyanate groups is made accessible in a substantial manner to the expert from the processes described in the scope of the present text. Also, the manufacture of polymers that carry one or more silyl groups has already been described in the scope of the present text. However, it is moreover possible to manufacture polymers that carry silyl groups by treating polymers that carry isocyanate groups according to the definition of the present text with appropriate amines carrying silyl groups.

Accordingly, the present invention also includes compositions that are manufactured by treating a reaction product, as described in the present text that possesses isocyanate groups with at least one amine carrying at least one silyl group.

Suitable polyurethanes with appropriate silyl groups can be easily prepared by the reaction of corresponding prepolymers with preferably two or more isocyanate groups with silanes of the general formula II

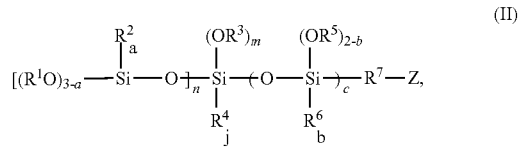

in which the groups $R^1$ to $R^6$, independently of one another, stand for a linear or branched, saturated or unsaturated hydrocarbon group with 1 to about 24 carbon atoms, a saturated or unsaturated cycloalkyl group with 4 to about 24 carbon atoms or an aryl group with 6 to about 24 carbon atoms, $R^7$ stands for an optionally substituted alkylene group with 1 to about 44 carbon atoms, an optionally substituted cycloalkenyl group with 6 to about 24 carbon atoms or an optionally substituted arylene group with 6 to 24 carbon atoms, Z stands for OH, $NH_2$, $NHR^8$, SH, COOH or NCO, n, m and j each stand for a whole number from 0 to 3, wherein m+n+j=3, a stands for a whole number from 0 to 3, b for a whole number from 0 to 2 and c for a number from 0 to 8 and $R^8$ stands for a linear or branched $C_{1-24}$ alkyl group, cyclohexyl-, phenyl-, tolyl-, mesityl-, trityl-, 2,4,6-tri-tert-butylphenyl group.

Fundamentally, any compounds of the general formula II are suitable for manufacturing inventively suitable polyurethanes. Examples are: N-(α-methyldimethoxysilylmethyl) amine, N-(α-trimethoxysilylmethyl)amine, N-(α-diethylmethoxysilylmethyl)amine, N-(α-ethyldimethoxysilylmethyl)amine, N-(α-methyldiethoxysilylmethyl)amine, N-(α-triethoxysilylmethyl)amine, N-(α-ethyldiethoxysilylmethyl) amine, N-(β-methyldimethoxysilylethyl)amine, N-(β-trimethoxysilylethyl)amine, N-(β-ethyldimethoxysilylethyl) amine, N-(β-methyldiethoxysilylethyl)amine, N-(β-triethoxysilylethyl)amine, N-(β-ethyldiethoxysilylethyl) amine, N-(γ- methyldimethoxysilylethyl)amine, N-(γ-trimethoxysilylpropyl)amine, N-(γ-ethyldiethoxysilylpropyl)amine, N-(γ-methyldimethoxysilylbutyl)amine, N-(γtriethoxysilylpropyl)amine, N-(γ-ethyldiethoxysilylpropl)amine, N-(4-methyldimethoxysilylbutyl)amine, N-(4-triethoxysilylbutyl)amine, N-(4-diethylmethoxysilylbutyl) amine, N-(4-ethyldimethoxysilylbutyl)amine, N-(4-methyldiethoxysilylbutyl)amine, N-(4-triethoxysilylbutyl) amine, N-(4-diethylethoxysilylbutyl)amine, N-(4-ethyldiethoxysilylbutyl)amine, N-(5-methyldimethoxysilylpentyl)amine, N-(5-trimethoxysilylpentyl)amine, N-(5-triethylsilylpentyl) amine, N-(5-ethyldimethoxysilylpentyl)amine, N-(5-methyldiethoxysilylpentyl)amine, N-(5-triethoxysilylpentyl)amine, N-(5-diethylethoxysilylpentyl) amine, N-(5-ethyldiethoxysilylpentyl)amine, N-(6-methyldimethoxysilylhexyl)amine, N-(6-trimethoxysilylhexyl)amine, N-(6-ethyldimethoxysilylhexyl)amine, N-(6-methyldiethoxysilylhexyl)amine, N-(6-triethoxysilylhexyl) amine, N-(6-ethyldiethoxysilylhexyl)amine, N-[γ-tris-(trimethoxysiloxy)silylpropyl]amine, N-[γ-tris (trimethoxysiloxy)silylpropyl]amine, N-(γ-trimethoxysiloxydimethylsilylpropyl)amine, N-(γ-trimethylsiloxydimethoxysilylpropyl)amine, N-(γ-triethoxysiloxydiethylpropyl)amine, N-(γ-triethoxysiloxydiethoxysilylpropyl)amine, N,N-butyl-(γ-trimethoxysilylpropyl)amine, N,N-butyl-(γ-triethoxysilylpropyl)amine, N,N-phenyl-(γ-trimethoxysilylpropyl)amine, N,N-phenyl-(γ-triethoxysilylpropyl)amine, N,N-cyclohexyl-(γ-trimethoxysilylpropyl)amine, N,N-ethyl-(γ-trimethoxysilylpropyl)amine, diethyl-N-(trimethoxysilylpropyl)aspartate, diethyl-N-(triethoxysilylpropyl)aspartate N,N-ethyl-(γ-dimethoxymethylsilylpropyl)amine, N,N-ethyl-(γ-trimethoxysilylisobutyl)amine, N,N-bis-(trimethoxypropyl) amine, N,N-ethyl-(γ-trimethoxysilylisobutyl)amine, N,N-ethyl-α-trimethoxysilylmethyl)-amine, dibutyl-N-(trimethoxysilylpropyl)aspartate, dibutyl-N-(triethoxysilylpropyl)aspartate, N,N-(β-aminopropyl)-(γ-trimethoxy-silylpropyl)amine, N,N'-di(trimethoxysilylpropyl)ethylenediamine, tetra-(trimethoxysilylpropyl)ethylenediamine and N,N-ethyl-(β-trimethoxysilylethyl)amine or N-[γ-tris(trimethylsiloxy) silylpropyl]amine or N,N-cyclohexyl-α-triethoxysilylmethylamine or N,N-cyclohexyl-α-methyldiethoxysilylmethylamine or N,N-phenyl-α-trimethoxysilylmethylamine or N,N-phenyl-α-methyldimethoxysilylmethylamine or mixtures of two or more thereof.

The polyurethanes, which optionally carry silyl groups, described in the scope of the present invention, are manufactured by coupling compounds having two or more isocyanate groups with compounds having a corresponding number of functional groups that possess at least one active hydrogen atom. Usually, a reaction of this type is carried out in the presence of a catalyst, particularly when as reaction partner, a polyol or a mixture of two or more polyols is used.

Typical catalysts used to manufacture such polyurethanes include, for example, strong basic amides such as 2,3-dimethyl-3,4,5,6-tetrahydropyrimidine, tris(dialkylaminoalkyl)-s-hexahydrotriazines, e.g. tris(N,N-dimethylaminopropyl)-s-hexahydrotriazine or the usual tertiary amines, e.g. triethylamine, tributylamine, dimethylbenzylamine, N-ethyl-, N-methyl-, N-cyclohexylmorpholine, dimethylcyclohexylamine, dimorpholinodiethyl ether, 2-(dimethylaminoethoxy)ethanol, 1,4-diazabicyclo[2,2,2]octane, 1-azabicyclo[3,3,0]octane, N,N,N',N'-tetramethylethylenediamine, N,N, N',N'-tetramethylbutanediamine, N,N,N',N'-tetramethylhexane-1,6-diamine, pentamethyldiethylenetriamine, tetramethyldiaminoethyl ether, bis(dimethylaminopropyl)-urea, N,N'-dimethylpiperazine, 1,2-dimethylimidazole, di-(4-N,N-dimethylaminocyclohexyl)methane and the like, as well as organometallic compounds such as titanates, iron compounds such as e.g. iron-(III)-acetylacetonate, tin compounds, e.g. tin(II) salts of organic carboxylic acids, for example tin(II) diacetate, the tin(II) salt of 2-ethylhexanoic acid (tin(II) octoate), tin(II) dilaurate or the dialkyltin(IV) salts of organic carboxylic acids, such as, e.g. dibutyltin(IV) diacetate, dibutyltin(IV) dilaurate, dibutyltin(IV) maleate or dioctyltin(IV) diacetate or the like, as well as dibutyltin(IV) dimercaptide or mixtures of two or more of the cited catalysts as well as synergistically active combinations of strongly basic amines and organometallic compounds. The catalysts can be used in usual amounts, for example about 0.002 to about 5 wt. %, based on the polyalcohols.

The present invention also relates to inventive crosslinkable preparations that comprise a suitable polymer or a mixture of two or more suitable polymers, as has been described in the present text, and at least a further additive.

Accordingly, an inventive preparation comprises the inventive silanized polyurethane or a plurality of different polyurethanes of this type and, for example, one or more compounds, selected from the group consisting of plasticizers, reactive diluents, antioxidants, curing agents, fillers, tackifiers, drying agents, water scavengers and UV stabilizers.

In the scope of the inventive addition proposals, the inventive polyurethane carrying silyl groups can be already used as is in the form described up to now. However, it is usually advantageous when the inventive polyurethane is used in a preparation that comprises additional compounds, for example to adjust the viscosity or the material properties.

For example, it is possible that the viscosity of the inventive polyurethanes is too high for specific applications. However, it has been determined that the viscosity of the inventive polyurethane can be easily and conveniently reduced by using a "reactive diluent" without substantially impairing the material properties of the cured polyurethane.

Exemplary suitable reactive diluents are a second polyurethane having an end group that is reactive towards water, particularly an NCO group or an alkoxysilane group, or both, with a molecular weight ($M_n$) of max. 10 000 and at least 3000 preferably 5000 less than the molecular weight of the first polyurethane.

Preferably, the reactive diluent possesses a functional group that under the influence of moisture is able to react with a reactive group of the first, inventive polyurethane to undergo chain extension or crosslinking. The at least one functional group can be any functional group that reacts under the influence of moisture to afford crosslinking or chain extension.

All polymeric compounds that are miscible with the first inventive polyurethane to reduce the viscosity and which do not substantially modify the material properties of the resulting product after curing or crosslinking resulting in an unusable product are suitable as reactive diluents. Polyesters, polyethers, polymers of compounds with olefinically unsaturated double bonds or polyurethanes are examples of suitable reactive diluents, if the abovementioned requirements are fulfilled.

However, the reactive diluents are preferably polyurethanes having at least one alkoxysilane group as the reactive group.

The reactive diluents can possess one or more functional groups, but preferably the number of functional groups is from 1 to about 6, particularly from 2 to about 4, for example 3.

In a preferred embodiment, the viscosity of the reactive diluent is less than 20 000 mPas, particularly about 1000 to about 10 000, for example about 3000 to about 6000 mPas (Brookfield RVT, 23° C., spindle 7, 2.5 rpm).

In the scope of the inventive process, suitable reactive diluents can have any molecular weight distribution (PD) and consequently can be manufactured by conventional methods.

Preferably, polyurethanes are used as reactive diluents and can be manufactured from a polyol component and an isocyanate component followed by functionalization with one or more alkoxysilane groups.

In the context of the present text, the term "polyol component" hereby includes a single polyol or a mixture of two or more polyols that can be used for the manufacture of polyurethanes. A polyol is understood to mean a polyhydric alcohol i.e. a compound with more than one OH group in the molecule, as already described in the context of the present text as the component for the manufacture of the component A.

Numerous polyols can be used as the polyol component for manufacturing reactive diluents. Examples of these are aliphatic alcohols with 2 to 40H groups per molecule. The OH groups can be primary or secondary. Suitable aliphatic alcohols include for example ethylene glycol, propylene glycol and similar polyhydric alcohols as already described in the scope of the present text.

Polyethers, modified with vinyl polymers, are also suitable for use as polyol components. These types of product are obtainable, for example, by polymerizing styrene and/or acrylonitrile in the presence of polyethers.

Polyester polyols having a molecular weight of about 200 to about 5000 are also suitable as polyol components for manufacturing the reactive diluent. Thus, polyester polyols can be used, which result, for example, from the above described reaction of low molecular weight alcohols, particularly ethylene glycol, diethylene glycol, neopentyl glycol, hexanediol, butanediol, propylene glycol, glycerin or trimethylolpropane with caprolactone. 1,4-Hydroxymethylcyclohexane, 2-methyl-1,3-propanediol, 1,2,4-butanediol, triethylene glycol, tetraethylene glycol, polyethylene glycol, dipropylene glycol, polypropylene glycol, dibutylene glycol and polybutylene glycol are also suitable polyhydric alcohols for manufacturing polyester polyols, as already mentioned.

Further suitable polyester polyols as described above can be manufactured by polycondensation. Thus, dihydric and/or trihydric alcohols can be condensed with an excess of dicarboxylic acids and/or tricarboxylic acids or their reactive derivatives to polyester polyols. Suitable dicarboxylic acids and tricarboxylic acids as well as suitable alcohols have already been described above.

In the context of the present invention, particularly preferred as polyol components for manufacturing reactive diluents are the exemplary suitable polyols dipropylene glycol and/or polypropylene glycol with a molecular weight of about 400 to about 2500, as well as polyester polyols, preferably polyester polyols obtained by the polycondensation of hexanediol, ethylene glycol, diethylene glycol or neopentyl glycol or mixtures of two or more thereof and isophthalic acid or adipic acid or their mixtures.

Polyacetals are also suitable polyol components for manufacturing the reactive diluents. Polyacetals are understood to mean compounds that are obtained from glycols, for example diethylene glycol or hexanediol, with formaldehyde. In the scope of the invention, suitable polyacetals can also be cyclic acetals obtained by polymerization.

Polycarbonates are also suitable polyols for manufacturing the reactive diluents. Polycarbonates can be obtained for example by the reaction of diols such as propylene glycol, 1,4-butanediol or 1,6-hexanediol, diethylene glycol, triethylene glycol or tetraethylene glycol or mixtures of two or more thereof with diaryl carbonates, for example diphenyl carbonate, or phosgene.

OH group-containing polyacrylates are also suitable polyol components for manufacturing the reactive diluents. These polyacrylates are obtained for example by polymerizing ethylenically unsaturated monomers that carry an OH group. Such monomers are obtained, for example, from the esterification of ethylenically unsaturated carboxylic acids by dihydric alcohols, the alcohol being present generally in slight excess. For this, suitable exemplary unsaturated carboxylic acids are acrylic acid, methacrylic acid, crotonic acid or maleic acid. Suitable exemplary esters that have OH-groups are 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

The inventively preferred reactive diluents are manufactured by treating the corresponding polyol component with an at least difunctional isocyanate. Fundamentally, each isocyanate having at least two isocyanate groups can be considered as the at least difunctional isocyanate, however, in the scope of the present invention, compounds with two to four isocyanate groups, particularly with two isocyanate groups, are generally preferred.

The polyisocyanates already mentioned above are particularly suitable for manufacturing the reactive diluents.

In the scope of the present invention the compound present as the reactive diluent preferably possesses an alkoxysilane group, di- and trialkoxysilane groups being preferred.

Under certain conditions of application it can be advantageous if the functional groups of the reactive diluent exhibit a different reactivity towards moisture or to each used curing agent than the functional groups of the inventive higher molecular weight polyurethane carrying silyl groups. Thus, for example, it may be required that the reactive diluent react more slowly than the first polyurethane so as to obtain the fastest possible crosslinking effect of the long chain polymer molecules. If the first polyurethane possesses one or more alkoxysilane end groups, then the reactivity of the end groups of the reactive diluent can be controlled, for example, by using different alkoxy groups than those in the end groups of the inventive polyurethane carrying silyl groups.

In general, the inventive preparation comprises the inventive polyurethane or a mixture of two or more inventive polyurethanes and the reactive diluent or a mixture of two or more reactive diluents in a ratio such that the viscosity of the preparation is maximum 300 000 mPas (Brookfield RVT, 23° C., spindle 7, 2.5 rpm). Generally, an amount of reactive diluent (or a mixture of two or more reactive diluents), based on the total preparation, of about 1 wt. % up to about 70 wt. %, particularly about 5 wt. % to about 25 wt. %, is suitable for this.

The viscosity of the inventive polyurethane can also be reduced by using a plasticizer in addition to, or instead of a reactive diluent.

In the scope of the present invention, compounds that are designated as "plasticizers" are inert towards the first polyurethane and bring about the reduction in viscosity of a preparation that comprises an inventive polyurethane or a mixture of two or more inventive polyurethanes.

Examples of suitable plasticizers are abietic acid esters, adipic acid esters, azelaic acid esters, benzoic acid esters, butyric acid esters, acetic acid esters, esters of higher fatty acids with about 8 to about 44 carbon atoms, esters of fatty acids with OH groups or epoxidized fatty acids, fatty acid esters and fats, glycolic acid esters, phosphoric acid esters, phthalic acid esters, of linear or branched alcohols with 1 to 12 carbon atoms, propionic acid esters, sebacic acid esters, sulfonic acid esters, thiobutyric acid esters, trimellitic acid esters, citric acid esters as well as esters based on nitrocellulose and polyvinyl acetate, as well as mixtures of two or more thereof. The asymmetric esters of difunctional, aliphatic dicarboxylic acids are particularly suitable, for example the esterified product of the monooctyl ester of adipic acid with 2-ethylhexanol (Edenol DOA, Cognis, Düsseldorf). Moreover, plasticizing alkyl sulfonic acid esters such as phenyl alkyl sulfonic acid esters are suitable.

Pure or mixed ethers of monofunctional, linear or branched C4-16 alcohols or mixtures of two or more different ethers of such alcohols, for example dioctyl ether (available as Cetiol OE, Cognis, Düsseldorf) are also suitable as plasticizers.

In a further preferred embodiment, blocked end group polyethylene glycols are used as plasticizers. For example polyethylene- or polypropylene glycol di-$C_{1-10}$-alkyl ethers, particularly dimethyl- or diethyl ethers of diethylene glycol or dipropylene glycol, as well as mixtures of two or more thereof.

In the scope of the present invention, diurethanes are also suitable as plasticizers. Diurethanes can be manufactured, for example, by treating diols having OH end groups with monofunctional isocyanates, the stoichiometry being chosen such that essentially all free OH groups react. Optionally, excess isocyanate can be subsequently removed from the reaction mixture by distillation, for example. A further method for manufacturing diurethanes consists in treating monohydric alcohols with diisocyanates, wherein all possible NCO groups react.

Diols having 2 to about 22 carbon atoms can be used to manufacture diurethanes based on diols, for example ethylene glycol, propylene glycol, 1,2-propanediol, dibutanediol, hexanediol, octanediol or industrial mixtures of hydroxyfatty alcohols having about 14 carbon atoms, particularly hydroxystearyl alcohol. Linear diol mixtures are preferred, particularly those comprising polypropylene glycol with a molecular weight ($M_n$) of about 1000 to about 6000, in amounts greater than about 50 wt. %, particularly greater than about 70 wt. %. Diurethanes with the same or different average molecular weights of about 1000 to about 4000, which are exclusively based on propylene glycol, are quite particularly preferred. All the free OH groups of the diol mixture are essentially totally reacted with aromatic or aliphatic monoisocyanates or their mixtures. Preferred monoisocyanates are phenyl isocyanate or toluene isocyanate or their mixtures.

Aromatic or aliphatic diisocyanates or their mixtures are used to manufacture the diurethanes based on diisocyanates. Isocyanates, for example, such as described above for manufacturing the inventive polyurethane, preferably toluene diisocyanate (TDI), are suitable as aromatic or aliphatic diisocyanates. The free NCO groups of the diisocyanates are essentially completely reacted with monohydric alcohols, preferably linear, monohydric alcohols or mixtures of two or more different monohydric alcohols. Mixtures of linear, monohydric alcohols are particularly suitable. Suitable exemplary monoalcohols are monoalcohols having 1 to about 24 carbon atoms, for example methanol, ethanol, the positional isomers of propanol, butanol, pentanol, hexanol, heptanol, octanol, decanol or dodecanol, particularly the respective 1-hydroxy compounds, as well as mixtures of two or more thereof. "Industrial mixtures" of alcohols and blocked end group polyalkylene glycol ethers are also suitable. Alcohol mixtures that comprise polypropylene glycol monoalkyl ethers with an average molecular weight ($M_n$) of about 200 to about 2000 in an amount of greater than about 50 wt. %, preferably greater than about 70 wt. %, based on the alcohol mixture, are particularly suitable. Diurethanes based on diisocyanates whose free NCO groups have been completely reacted with polypropylene glycol monoalkyl ethers with an average molecular weight of about 500 to about 2000 are particularly preferred.

In general, the inventive preparation comprises the cited plasticizers in an amount such that the viscosity of the preparation is maximum about 300 000 mPas (Brookfield RVT, 23° C., spindle 7, 2.5 rpm).

Bearing in mind the different polyurethanes that can be comprised in the preparation, a varying amount of plasticizer may be needed in order to attain the required viscosity. Generally however, the required viscosity can be attained by the addition, for example, of an amount of about 1 to about 40 wt. % plasticizer, based on the preparation. Increasing the amount of plasticizer generally leads to a further decrease in viscosity.

The inventive preparation can comprise the reactive diluent or the plasticizer in each case singly or in a mixture.

In addition to reactive diluents and plasticizers, the inventive preparation can comprise even more additives that generally serve to modify specific material properties of the preparation before or after processing or boost the stability of the preparation before or after processing.

It often makes sense to further stabilize the inventive preparations against the ingress of moisture so as to further increase the shelf life.

Such an increase in shelf life can be achieved, for example, by the addition of water scavengers. All compounds that react with water to afford groups that are inert towards the reactive groups present in the preparation and thereby effect the lowest possible changes in its molecular weight are suitable as water scavengers. In addition, the reactivity of the stabilizers towards the moisture that permeated into the preparation, must be higher than the reactivity of the end groups of the inventive polyurethane or the mixture of two or more polyurethanes present in the preparation Isocyanates, for example, are suitable water scavengers.

However, in a preferred embodiment, silanes are used as the water scavengers. Examples are vinyl silanes such as 3-vinylpropyl triethoxysilane, oximesilanes like methyl-O, O',O'''-butane-2-one-trioximosilane or O,O',O'',O'''-butane-2-onetetraoximosilane (CAS Nr. 022984-54-9 and 034206-40-1 or benzamidosilanes like bis(N-methylbenzamido)

methylethoxysilane (CAS Nr. 16230-35-6) or carbamatosilanes like carbamatomethyl trimethoxysilane.

The above-cited reactive diluents are also suitable as water scavengers if they have a molecular weight ($M_n$) of less than about 5000 and dispose of end groups whose reactivity towards the permeated moisture is at least as high as the reactivity of the reactive groups of the inventive polyurethane.

The inventive preparation generally comprises about 0 to about 6 wt. % water scavenger.

In addition, the inventive preparation can comprise up to about 7 wt. %, particularly about 3 to 5 wt. % antioxidants.

The inventive preparation can comprise up to about 2 wt. %, preferably about 1 wt. % of UV stabilizers. The hindered amine light stabilizers (HALS) are particularly suited as UV stabilizers. In the scope of the invention, it is preferred if a UV stabilizer is used that has a silane group and becomes attached to the end product during crosslinking or curing. The products Lowilite 75 and Lowilite 77 (Great Lakes, USA) are particularly suitable for this.

Furthermore, an inventive preparation can comprise from about 0 wt. % up to about 50 wt. % filler. Examples of suitable fillers are silane-compatible inorganic compounds like chalk, lime powder, kaolin, talc, barium sulfate, mica, precipitated silica, pyrogenic silica, zeolites, bentonites, ground minerals, glass beads, powdered glass, hollow glass beads, glass fibers, as well as organic fillers, particularly short fibers or hollow plastic beads. Optionally, fillers can be used that lend thixotropy to the preparation, for example swellable plastics like PVC, polyamide powder or polyamide waxes.

The amount of fillers in the inventive composition is, for example, up to about 30 wt. % or up to about 10 wt. % or up to about 2 wt. %.

In principle, an inventive preparation can exhibit a viscosity within a broad viscosity range. Depending on the application, the viscosity can be, for example, in the range of about 500 to about 600 000 or about 2000 to about 400 000 mPas (measured with Brookfield RVT, 23° C., spindle 7, 2.5 rpm).

The subject of the invention is also the use of the inventive composition as adhesives, sealants, surface coatings, fillers and for manufacturing molded parts.

A further field of application of the inventive compositions is the use as plugs, hole fillers or crack fillers.

Thus, for example, the adhesive is suitable as an adhesive for plastics, metals, mirrors, glass, ceramics, mineral foundations, wood, leather, textiles, paper, cardboard and rubber, wherein the materials can each be adhered to themselves or to any other.

In addition, the inventive composition is suitable as a surface coating agent for plastic, metal, glass, ceramic, mineral material, wood, leather, textile, paper, cardboard and rubber surfaces.

The cited possibilities of usage are only exemplary and do not serve to limit the invention.

As used herein, and in particular as used herein to define the elements of the claims that follow, the articles "a" and "an" are synonymous and used interchangeably with "at least one" or "one or more," disclosing or encompassing both the singular and the plural, unless specifically defined otherwise. The conjunction "or" is used herein in its inclusive disjunctive sense, such that phrases formed by terms conjoined by "or" disclose or encompass each term alone as well as any combination of terms so conjoined, unless specifically defined otherwise. All numerical quantities are understood to be modified by the word "about," unless specifically modified otherwise or unless an exact amount is needed to define the invention over the prior art.

The invention is described in more detail by means of the examples, which do not limit the invention.

EXAMPLES

Example 1

282 g (15 mmol) Polypropylene glycol 18000 (OH Nr=6.0) were dried at 100° C. under vacuum in a 500 ml three-necked flask. 0.06 g dibutyltin dilaurate was added under a nitrogen atmosphere at 80° C. and subsequently treated with 7.2 g (32 mmol) isocyantopropyltrimethoxysilane (% NCO=18.4). After stirring for one hour at 80° C. the resulting polymer was cooled and treated with 6 g vinyl trimethoxysilane. The product was stored in a glass jar in a nitrogen atmosphere with the exclusion of moisture.

Example 2

260.5 g (88 mmol) PolyTHF 2900 (OH Nr=38) were dried at 100° C. under vacuum in a 500 ml three-necked flask. 0.06 g dibutyltin dilaurate was added under a nitrogen atmosphere at 80° C. and subsequently treated with 7.8 g (44 mmol) TDI (% NCO=47.8). After stirring for one hour at 80° C. the resulting polymer was treated with 21.1 g isocyanatopropyl trimethoxysilane (% NCO=18.4) and stirred for a further hour at 80° C. The polymer was cooled and treated with 6 g vinyl trimethoxysilane. The product was stored in a glass jar in a nitrogen atmosphere with the exclusion of moisture.

Example 3

The polymers of Example 1 and Example 2 were mixed together in various proportions. The mixtures were treated with 1% N-aminoethyl-3-aminopropyl trimethoxysilane and 0.2% dibutyltin dilaurate. Films of 1 mm thickness were applied onto a glass plate and the skin over time SOT as well as tack free time TFT were determined. After storage for one week the films were torn off.

| Polymer 1 [%] | 100 | 90 | 80 | 70 | 60 | 50 | 0 |
|---|---|---|---|---|---|---|---|
| Polymer 2 [%] | 0 | 10 | 20 | 30 | 40 | 50 | 100 |
| SOT [min.] | 10 | 9 | 10 | 10 | 9 | 8 | 7 |
| TFT [hr.] | 2 | 2 | 2 | 2 | 2 | 2 | 2.5 |
| Break strength [N/mm$^2$] | 0.63 | 0.87 | 1.03 | 1.19 | 1.35 | 1.54 | 1.28 |
| Elongation at break [%] | 57 | 65 | 73 | 78 | 82 | 85 | 35 |

Example 4

The polymer from Example 2 was mixed in various proportions with a silane-terminated polymer from Kaneka (S203H). The mixtures were treated with 1% N-aminoethyl-3-aminopropyl trimethoxysilane and 0.2% dibutyltin diacetonate. Films of 1 mm thickness were applied onto a glass plate and after one-week storage the cured films were torn off.

| Polymer 2 [%] | 100 | 75 | 25 | 0 |
|---|---|---|---|---|
| Kaneka S203H [%] | 0 | 25 | 75 | 100 |
| Break strength [N/mm$^2$] | 1.61 | 1.97 | 0.55 | 0.34 |
| Elongation at break [%] | 37 | 110 | 286 | 251 |

Example 5

The polymer from Example 2 was mixed in various proportions with a silane-terminated polymer from Kaneka (S303H). The mixtures were treated with 1% N-aminoethyl-3-aminopropyl trimethoxysilane and 0.2% dibutyltin diacetonate. Films of 1 mm thickness were applied onto a glass plate and after one-week storage the cured films were torn off.

| | | | | |
|---|---|---|---|---|
| Polymer 2 [%] | 100 | 75 | 25 | 0 |
| Kaneka S303H [%] | 0 | 25 | 75 | 100 |
| Break strength [N/mm$^2$] | 1.61 | 1.82 | 1.11 | 0.47 |
| Elongation at break [%] | 37 | 98 | 214 | 134 |

Example 6

117 g (6 mmol) Polypropylene glycol 18000 (OH Nr=6.0) and 108 g (37 mmol) polyTHF 2900 (OH Nr=38) were dried at 100° C. under vacuum in a 500 ml three-necked flask. 0.06 g dibutyltin dilaurate was added under a nitrogen atmosphere at 80° C. and subsequently treated with 3.0 g (17 mmol) TDI (% NCO=47.8). After stirring for one hour at 80° C. the resulting polymer was treated with 12.4 g (54 mmol) isocyanatopropyl trimethoxysilane (% NCO=18.4) and stirred for a further hour at 80° C. The polymer was cooled and treated with 6 g vinyl trimethoxysilane. The product was stored in a glass jar in a nitrogen atmosphere with the exclusion of moisture.

Example 7

139.5 g (17 mmol) Polypropylene glycol 8000 (OH Nr=14.0) and 114.2 g (116 mmol) polyTHF 1000 (OH Nr=114) were dried at 100° C. under vacuum in a 500 ml three-necked flask. 0.06 g dibutyltin dilaurate was added under a nitrogen atmosphere at 80° C. and subsequently treated with 16.4 g (93 mmol) TDI (% NCO=47.8). After stirring for one hour at 80° C. the resulting polymer was treated with 19.3 g (84 mmol) isocyanatopropyl trimethoxysilane (% NCO=18.3) and stirred for a further hour at 80° C. The polymer was cooled and treated with 6 g vinyl trimethoxysilane. The product was stored in a glass jar in a nitrogen atmosphere with the exclusion of moisture.

Example 8

139.5 g (17 mmol) Polypropylene glycol 8000 (OH Nr=14.0) were dried at 100° C. under vacuum in a 500 ml three-necked flask. 0.06 g dibutyltin dilaurate was added under a nitrogen atmosphere at 80° C. and subsequently treated with 16.4 g (93 mmol) TDI (% NCO=47.8). After stirring for one hour at 80° C. the resulting polymer was treated with 114.2 g (116 mmol) polyTHF 1000 (OH Nr=114) and stirred for a further hour at 80° C. 19.3 g (84 mmol) isocyanatopropyl trimethoxysilane (% NCO=18.3) were added and the mixture was stirred at 80° C. for a further hour. The polymer was cooled and treated with 6 g vinyl trimethoxysilane. The product was stored in a glass jar in a nitrogen atmosphere with the exclusion of moisture.

Example 9

The properties of the polymers from Examples 6-8 were determined and adhesive formulations were prepared.

| | Polymer 6 | Polymer 7 | Polymer 8 |
|---|---|---|---|
| Polymer films*: | | | |
| Appearance (after 7 days at RT) | milky | milky | clear |
| Appearance (after 6 weeks at 40° C.) | cloudy/ phase separation | cloudy/ slight phase separation | clear/ no phase separation |
| Appearance (after 6 months at room temperature) | solid/ partially crystallized | cloudy/very highly viscous | Clear/ homogeneous/ good flowability |
| Break strength* [N/mm$^2$] | 1.0 | 0.9 | 1.1 |
| Elong. at break* [%] | 73 | 33 | 46 |
| Adhesive Formulation**: | | | |
| Appearance (Film)** | cloudy | opaque | transparent |
| Break strength (Film)** [N/mm] | 3.4 | 2.4 | 2.0 |
| Elong. at break (Film)** [%] | 170 | 56 | 71 |
| Tensile shear strength** wood/wood [N/mm$^2$] | 4.3 | 5.1 | 5.2 |
| Tensile shear strength** wood/PVC [N/mm$^2$] | 4.0 | 4.6 | 4.5 |
| Tensile shear strength** wood/aluminum [N/mm$^2$] | 2.4 | 2.1 | 1.9 |
| Tensile shear strength** wood/brass [N/mm$^2$] | n.d. | 5.1 | 2.3 |
| Tensile shear strength** wood/glass [N/mm$^2$] | n.d. | 2.5 | 3.0 |

*Films manufactured with 1% N-aminoethyl-3-aminopropyl trimethoxysilane and 0.2% dibutyltin laurate
**Films and wood adhesions prepared from adhesive formulation with 8% Aerosil R 8200, 1% N-aminoethyl-3-aminopropyl trimethoxysilane and 0.2% dibutyltin laurate

Example 10

155.1 g (19 mmol) Polypropylene glycol 8000 (OH Nr=14.0) were dried at 100° C. under vacuum in a 500 ml three-necked flask. 0:06 g dibutyltin laurate was added under a nitrogen atmosphere at 80° C. and subsequently treated with 15.3 g (87 mmol) TDI (% NCO=47.8). After stirring for one hour at 80° C. the resulting polymer was treated with 103.4 g (105 mmol) polyTHF 1000 (OH Nr=114) and stirred for a further hour at 80° C. A mixture of 10.2 g (45 mmol) isocyanatopropyl trimethoxysilane. (% NCO=18.3) and 5.5 g (34 mmol) isocyanatomethyl dimethoxymethylsilane (% NCO=25.7) was added and the mixture was stirred at 80° C. for a further hour. The polymer was cooled and treated with 6 g vinyl trimethoxysilane. The product was stored in a glass jar in a nitrogen atmosphere with the exclusion of moisture.

Example 11

171.2 g (21 mmol) Polypropylene glycol 8000 (OH Nr=14.0) were dried at 100° C. under vacuum in a 500 ml three-necked flask. 0.06 g dibutyltin laurate was added under a nitrogen atmosphere at 80° C. and subsequently treated with 14.2 g (81 mmol) TDI (% NCO=47.8). After stirring for one hour at 80° C. the resulting polymer was treated with 92.2 g (94 mmol) polyTHF 1000 (OH Nr=114) and stirred for a further hour at 80° C. 11.8 g (72 mmol) isocyanatomethyl dimethoxymethylsilane (% NCO=25.7) were added and the mixture was stirred at 80° C. for a further hour. The polymer was cooled and treated with 6 g vinyl trimethoxysilane. The product was stored in a glass jar in a nitrogen atmosphere with the exclusion of moisture.

Example 12

The properties of the polymers from Examples 8, 10 and 11 were determined:

|  | Polymer 8 | Polymer 10 | | Polymer 11 | |
|---|---|---|---|---|---|
| Catalyst* | DBTL | DBTL | DBU | DBTL | DBU |
| SOT* [min] | 15 | 20 | 1 | 8 | 0.25 |
| TFT* [min] | 180 | 240 | 30 | 90 | 15 |
| Break strength* | 1.1 | 0.8 | 1.0 | 0.7 | n.b. |
| Elong at break* [%] | 46 | 58 | 96 | 53 | n.b. |

*Films prepared with 1% N-aminoethyl-3-aminopropyl trimethoxysilane and 0.2% catalyst (DBTL = dibutyltin laurate; DBU = 1,8-diazabicyclo-[5.4.0]-undec-7-ene Example 13

143.3 g (21 mmol) Polypropylene glycol 8000 (OH Nr=14.0) were dried at 100° C. under vacuum in a 500 ml three-necked flask. 0.06 g dibutyltin laurate was added under a nitrogen atmosphere at 80° C. and subsequently treated with 28.1 g (160 mmol) TDI (% NCO=47.8). After stirring for one hour at 80° C. the resulting polymer was treated with 95.4 g (97 mmol) polyTHF 1000 (OH Nr=114) and stirred for a further hour at 80° C. 19.5 g (83 mmol) N-butylaminopropyl trimethoxysilane were added and the mixture was stirred at 80° C. for a further hour. The polymer was cooled and treated with 6 g vinyl trimethoxysilane. The product was stored in a glass jar in a nitrogen atmosphere with the exclusion of moisture. This polymer showed a skin formation time of 20 minutes and a tack free time of ca. 2.5 hours (catalysis with 1% N-aminoethyl-3-aminopropyl trimethoxysilane and 0.2% DBTL).

Example 14

143.3 g (21 mmol) Polypropylene glycol 8000 (OH Nr=14.0) were dried at 100° C. under vacuum in a 500 ml three-necked flask. 0.06 g dibutyltin dilaurate was added under a nitrogen atmosphere at 80° C. and subsequently treated with 28.1 g (160 mmol) TDI (% NCO=47.8). After stirring for one hour at 80° C. the resulting polymer was treated with 95.4 g (97 mmol) polyTHF 1000 (OH Nr=114) and stirred for a further hour at 80° C. 22.8 g (83 mmol) N-cyclohexylaminomethyl triethoxysilane were added and the mixture was stirred at 80° C. for a further hour. The polymer was cooled and treated with 6 g vinyl trimethoxysilane. The product was stored in a glass jar in a nitrogen atmosphere with the exclusion of moisture. This polymer showed a skin formation time of less than 1 minute and a tack free time of ca. 1 hour (catalysis with 1% N-aminoethyl-3-aminopropyl trimethoxysilane and 0.2% DBTL).

What is claimed is:

1. A crosslinkable polymeric composition comprising at least one crosslinkable polymer having one or more reactive silyl functional groups that are crosslinkable with or without a crosslinker, wherein the composition comprises either:
   a) a crosslinkable polymer whose polymer backbone includes a first polyether segment comprised of a plurality of polypropylene oxyalkylene units $OX^1$ and a second polyether segment comprised of a plurality of poly tetrahydrofuran oxyalkylene units $OX^2$; or
   b) a mixture of crosslinkable polymers comprising crosslinkable polymer a) and at least one first crosslinkable polymer whose polymer backbone includes a polyether segment comprised of a plurality of polypropylene oxyalkylene units $OX^1$ and a second crosslinkable polymer whose polymer backbone includes a polyether segment comprised of a plurality of poly tetrahydrofuran oxyalkylene units $OX^2$; and the polyether segment comprised of first oxyalkylene units $OX^1$ and the polyether segment comprised of second oxyalkylene units $OX^2$ have a weight ratio of 10:90 to 90:10.

2. A crosslinkable polymeric composition comprising at least one crosslinkable polymer having one or more reactive silyl functional groups that are crosslinkable with or without a crosslinker, wherein the composition comprises either:
   a) a crosslinkable polymer whose polymer backbone includes a first oxyalkylene unit $OX^1$ and a second oxyalkylene unit $OX^2$; or
   b) a mixture of crosslinkable polymers comprising crosslinkable polymer a) and at least one first crosslinkable polymer whose polymer backbone includes an oxyalkylene unit $OX^1$ and a second crosslinkable polymer whose polymer backbone includes an oxyalkylene unit $OX^2$; wherein the oxyalkylene unit $OX^1$ is a polypropylene and the oxyalkylene unit $OX^2$ is a poly tetrahydrofuran, and wherein the oxyalkylene unit $OX^1$ and the oxyalkylene unit $OX^2$ have a weight ratio of 10:90 to 90:10.

3. The composition of claim 2 wherein the oxyalkylene unit $OX^1$ has a molecular weight of about 2,000 to about 40,000.

* * * * *